CAROLINE ROSENTHAL.
Reels for Clothes-Lines.
No. 141,015. Patented July 22, 1873.
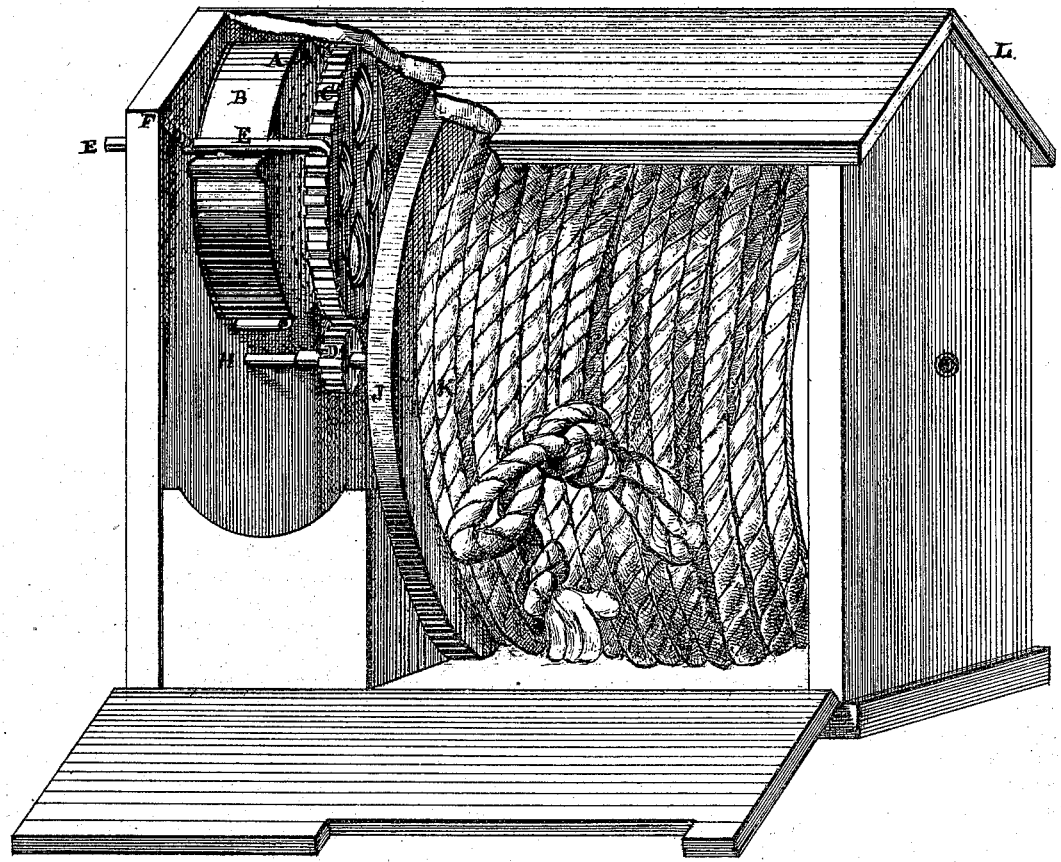
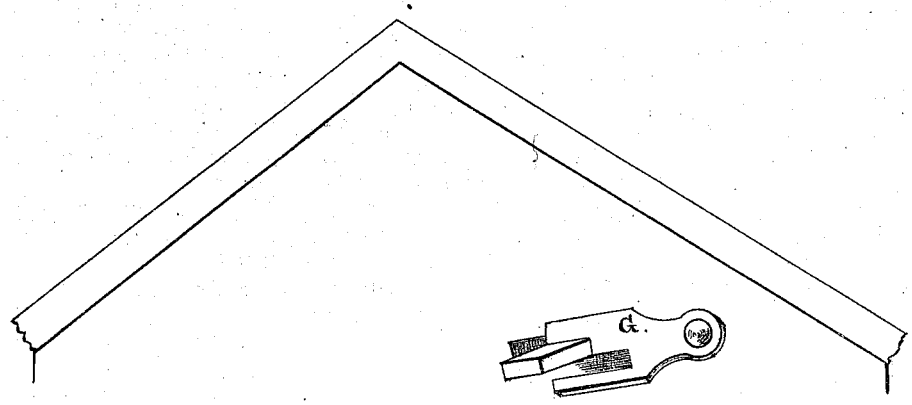
Witnesses.
Edw. T. Brown
H. S. Miller
Inventor
Caroline Rosenthal
By her Atty, J. F. Reigart

UNITED STATES PATENT OFFICE.

CAROLINE ROSENTHAL, OF PHILADELPHIA, PENNSYLVANIA.

IMPROVEMENT IN REELS FOR CLOTHES-LINES.

Specification forming part of Letters Patent No. 141,015, dated July 22, 1873; application filed February 21, 1873.

*To all whom it may concern:*

Be it known that I, CAROLINE ROSENTHAL, of the city of Philadelphia and State of Pennsylvania, have invented a new and useful Improved Reel for Clothes-Lines; and I do hereby declare the following to be an exact description of the same, reference being had to the accompanying drawings and to the letters of reference marked thereon making a part of this specification, in which—

Figure 1 represents a perspective view of the reel and its operating devices. Fig. 2 exhibits the catch or fastening on the outside of the box.

The nature of my invention consists in the arrangement and combination of the coiled spring with its regulating-box, spur-wheel, pinion-wheel, lock, spiral spring, and pivoted catch on the outside. The object of my invention consists in preserving the clothes-line from injury by the weather; keeping it from obstructing the yard; keeping the line clean.

A represents a coiled spring (inclosed in its metallic and regulating box B) attached to the spur-wheel C, that operates the pinion D, that drives the shaft H, that revolves the reel J, upon which the clothes-line K is wound.

As the rope or line is drawn out of the box L it revolves the reel with the coiled spring A, at the same time winding up the spring A. The rope is then fastened or hooked in any part of the yard, ready to hang the clothes upon; and when the rope is unhooked it is drawn into and wound upon the reel by the operation of the coiled spring. The lever or catch E is dropped into the spur-wheel C to lock the reel and spring A when a sufficient length of line has been drawn out. This lever is provided with a spiral spring, F, to hold the front end of the lever E firmly between the teeth of the spur-wheel to lock the machine. The opposite end of the lever E is fastened on the outside of the box L by a pivoted and slotted catch, G, that holds the lever permanently to its place until shifted to allow the reel to be operated when required.

What I claim as my invention, and desire to secure by Letters Patent, is—

The combination of coiled spring A, box B with its spur-wheel C, pinion-wheel D, catch E, provided with a spiral spring, F, and slotted pivoted catch G, when arranged and combined with the reel, as herein described, and for the purposes set forth.

CAROLINE ROSENTHAL.

Witnesses:
 JOHN NICHOLLS,
 CHAS. VANHORN.